(12) United States Patent
Mori et al.

(10) Patent No.: US 7,743,495 B2
(45) Date of Patent: Jun. 29, 2010

(54) METHOD OF MANUFACTURING CORD MANAGEMENT DEVICE

(75) Inventors: Kenneth Mori, Los Angeles, CA (US); Barry Sween, Santa Monica, CA (US); Yoko Iida, Los Angeles, CA (US); John Wadsworth, Los Angeles, CA (US)

(73) Assignee: Belkin International, Inc., Playa Vista, CA (US)

( * ) Notice: Subject to any disclaimer, the term of this patent is extended or adjusted under 35 U.S.C. 154(b) by 413 days.

(21) Appl. No.: 11/811,366

(22) Filed: Jun. 7, 2007

(65) Prior Publication Data

US 2007/0294887 A1    Dec. 27, 2007

Related U.S. Application Data

(62) Division of application No. 11/147,597, filed on Jun. 7, 2005, now Pat. No. 7,247,799.

(51) Int. Cl.
*H01R 43/00*    (2006.01)

(52) U.S. Cl. .............................. 29/857; 29/861; 29/862; 385/134; 385/135

(58) Field of Classification Search ................... 29/825, 29/857, 861–863; 385/134, 135
See application file for complete search history.

(56) References Cited

U.S. PATENT DOCUMENTS

| | | | | |
|---|---|---|---|---|
| 4,063,110 A | * | 12/1977 | Glick | .......................... 307/112 |
| 4,613,728 A | | 9/1986 | Lathrop | |
| 5,008,491 A | * | 4/1991 | Bowman | ..................... 174/489 |
| 6,162,071 A | * | 12/2000 | Muller | ........................ 439/142 |
| 6,278,063 B1 | * | 8/2001 | Conrad | .......................... 174/67 |
| 6,621,975 B2 | * | 9/2003 | Laporte et al. | .............. 385/135 |

* cited by examiner

*Primary Examiner*—C. J Arbes
(74) *Attorney, Agent, or Firm*—Bryan Cave LLP

(57) ABSTRACT

A method of manufacturing a cord management device. The method includes: (a) providing a power strip; (b) physically and electrically coupling a power cord to the power strip; (c) providing a stationary portion, providing the stationary portion includes: (1) providing a first wall; (2) providing two or more slots in the first wall configured to contain a first portion of a single electrical cord; and (3) providing a second wall spaced part from the first wall, the first wall and second wall defining a first space there between; (d) providing a cover; (e) hingedly attaching the cover to the stationary portion, thereby defining a second space; (f) integrating the power strip into the second space; and (g) locating a portion of the power cord in the first space.

21 Claims, 5 Drawing Sheets

US 7,743,495 B2

METHOD OF MANUFACTURING CORD MANAGEMENT DEVICE

CROSS REFERENCE TO RELATED APPLICATIONS

This application is a divisional of U.S. patent application Ser. No. 11/147,597, filed Jun. 7, 2005 now U.S. Pat. No. 7,247,799. U.S. patent application Ser. No. 11/147,597 is incorporated herein by reference.

FIELD OF THE INVENTION

This invention relates generally to cord management, and relates more particularly to cord management for surge protectors, power strips, and the like.

BACKGROUND OF THE INVENTION

Sustained advances in electronics technology has produced a wide variety of electronic devices that are both useful and economical. Consumers that acquire such devices often find themselves left with a work space plagued with the unpleasant and unsightly confusion created by the number of wires, cords, and cables required by each device. Beyond its unsightly appearance, such a tangle of wires can also be unsafe because kinked wires are more susceptible to failure and because it is sometimes difficult to identify a particular needed cable when it is intertwined with other cables in a disorderly way. Accordingly, there exists a need for a cord management device that allows cords, cables, wires, and the like to be both managed and organized and hidden from view.

BRIEF DESCRIPTION OF THE DRAWINGS

The invention will be better understood from a reading of the following detailed description, taken in conjunction with the accompanying figures in the drawings in which.

Figure 1:
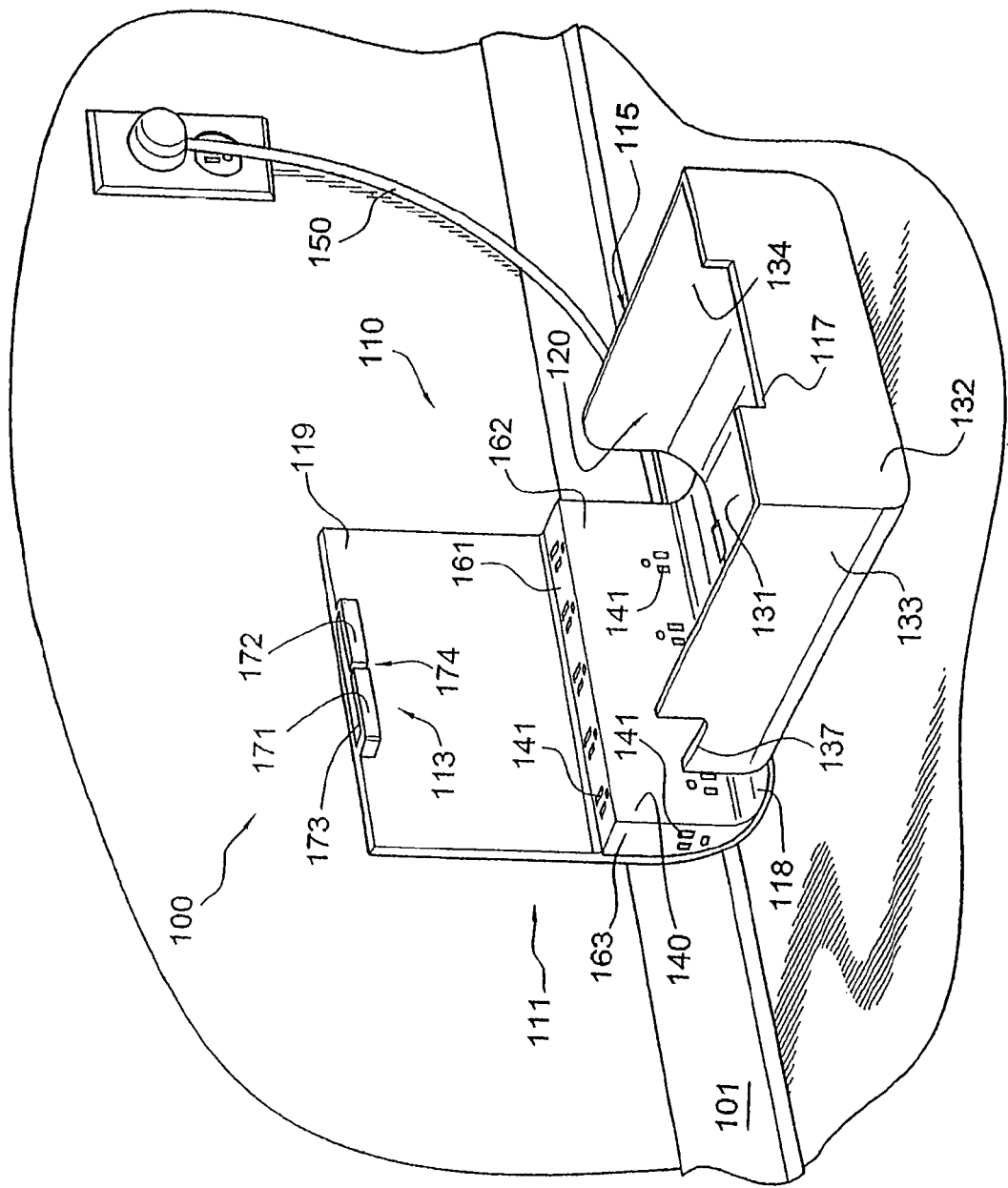
FIG. 1 is a perspective view of a cord management device according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a cord management device comprises a receptacle defining an interior space capable of containing a power strip. The receptacle comprises a stationary portion and a cover hingedly attached to the stationary portion. The cover has a cutout therein and the stationary portion comprises a cord management feature. The cover is capable of movement between a first position, in which the cover substantially encloses the interior space, and a second position, in which the interior space is exposed. The cutout in the cover interacts with the stationary portion of the receptacle to form an opening in the receptacle when the cover is in the first position.

Power cords plugged into the power strip may be managed by the cable management feature and may be routed through the opening when the cover is in the first position. The result is a neatly organized batch of cords that may be at least partially hidden from view.

Referring now to the figures, FIG. 1 is a perspective view of a cord management device 100 according to an embodiment of the invention. As illustrated in FIG. 1, cord management device 100 comprises a receptacle 110 defining an interior space 120. Receptacle 110 comprises a stationary portion 111 and a cover 115 hingedly attached to stationary portion 111 and having a cutout 117 therein.

Stationary portion 111 comprises a cord management feature 113. Cover 115 is capable of movement between a first position, in which cover 115 substantially encloses interior space 120, and a second position, in which interior space 120 is exposed. Cutout 117 interacts with stationary portion 111 to form an opening in receptacle 110 when cover 115 is in the first position.

Stationary portion 111 is so named because it tends to stay still while cover 115 moves with respect to it. In one sense, however, or in one operational mode, it is cover 115 that remains stationary while stationary portion 111 moves with respect to cover 115. Nevertheless, the respective names and reference numerals already given, and repeated here, for stationary portion 111 and cover 115 will continue to be used, in spite of the apparent discrepancy just alluded to.

In the illustrated embodiment, stationary portion 111 comprises a floor 118 and a wall 119 which is a back wall of receptacle 110. As suggested by FIG. 1, wall 119 may be placed against, and possibly fastened to, a baseboard 101 or the like. Further in the illustrated embodiment, cover 115 is hingedly attached to floor 118, meaning that cover 115 opens out and away from an upper portion of stationary portion 111 while remaining fixed to a lower portion of stationary portion 111. In a non-illustrated embodiment, cover 115 may be attached to a different portion of stationary portion 111. The hinging action of cover 115 may be accomplished in any of a variety of ways that will be well known to one of ordinary skill in the art, including, for example, by using a metal or plastic hinge attached to receptacle 110, a living hinge molded into the material of receptacle 110, a slot and pin arrangement, or any other suitable method as known in the art. Because they are known, none of the various hinging mechanisms are explicitly illustrated in the figures.

FIG. 1 depicts cover 115 in the second, or open, position. With cover 115 in the open position as shown, interior space 120 is exposed, meaning that it may be seen and accessed. Interior space 120 is defined by, or in other words, bounded and substantially enclosed by, receptacle 110 when cover 115 is in the first, or closed, position. The same volume of space exists when cover 115 is in the open position. Although that volume of space is not substantially enclosed by receptacle 110 when cover 115 is in the open position, it is still nevertheless referred to herein as interior space 120.

Cover 115 comprises a front panel 131, a top panel 132 substantially perpendicular to front panel 131, a side panel 133 substantially perpendicular to front panel 131 and to top panel 132, and a side panel 134 substantially parallel to and spaced apart from side panel 133. In the illustrated embodiment, cutout 117 is located in top panel 132.

Also in the illustrated embodiment, cord management device 100 further comprises a cutout 137 in side panel 133. In a non-illustrated embodiment, cutout 137 may be located in a different panel of cover 115, or it may not exist in cover 115 at all. A function of cutout 137 will be discussed below.

Interior space 120 is capable of and suitable for containing a power strip 140. As suggested by FIG. 1, power strip 140 may form at least a portion of floor 118 and or at least a portion of wall 119. In a different embodiment, receptacle 110 does not include a floor, and instead uses a surface on which cord management device 100 rests as the floor of receptacle 110. As it is used herein, the phrase "receptacle 110" includes embodiments such as that just described, even though the word "receptacle" may traditionally apply more accurately to an object that is not missing a side.

Power strip 140, which in one embodiment can be a surge protector or the like, comprises an electrical outlet 141. In a preferred embodiment, electrical outlet 141 is one of a plurality of electrical outlets of power strip 140. Accordingly, the phrase "electrical outlet 141" may be used herein to indicate any single one or any group of such plurality of electrical outlets, as indicated by the context. Nine such outlets are shown in the illustrated embodiment; non-illustrated embodiments may comprise some other number of such outlets. As an example, power strip 140 may comprise as few as three or as many as twelve electrical outlets, although numbers outside this range are also possible. The nine electrical outlets shown in the illustrated embodiment are grouped into different sets, as will be further discussed below. A power cord 150 is physically and electrically coupled to power strip 140, and is capable of supplying electric power to electrical outlet 141.

In one embodiment, power strip 140 is an integral part of cord management device 100, meaning it is permanently or removably attached to receptacle 110. As an example, power strip 140 can be molded or formed from the same piece that forms a portion of receptacle 110. As another example, power strip 140 can be fastened to receptacle 110 after the formation of receptacle 110, as with screws, rivets, welding links, or the like. In another embodiment, power strip 140 is not integral with cord management device 100, but is provided as a separate piece that sits within interior space 120 but is not attached to receptacle 110.

Referring still to FIG. 1, the plurality of electrical outlets 141 comprises a first set, in which adjacent ones of electrical outlets 141 are separated from each other by a first distance, and a second set, in which adjacent ones of electrical outlets 141 are separated from each other by a second distance. As an example, the first set of electrical outlets may be those located at a surface 161 of power strip 140, while the second set of electrical outlets may be those located at a surface 162 of power strip 140. As illustrated, the first distance—the distance separating adjacent ones of electrical outlets 141 in the first set—may be appropriate for standard two-prong or three-prong plugs. Similarly, the second distance—the distance separating adjacent ones of electrical outlets 141 in the second set—may be appropriate for the larger, bulkier, adapters commonly referred to as "power bricks," or simply "bricks." In a non-illustrated embodiment, the surfaces at which the first and second sets are located may be reversed. In the same or another non-illustrated embodiment, the entire geometry of power strip 140 may be different from what is depicted in FIG. 1. In other words, the FIG. 1 depiction, like all figure depictions herein, is intended to be illustrative but not limiting.

Referring still to the embodiment shown in FIG. 1, plurality of electrical outlets 141 farther comprises a third set characterized in that electrical outlets in the third set are accessible, such that electrical plugs may be inserted into them and removed therefrom, when cover 115 is in the closed position. The third set can contain a single electrical outlet, as shown, or it can contain multiple electrical outlets. Where there are multiple electrical outlets in the third set, one or more of such electrical outlets may be located at surface 163, at a surface of power strip 140 opposite surface 163, or at some other location on power strip 140.

As an example, cutout 137 provides access to electrical outlets in the third set when cover 115 is in the closed position. More specifically, when cover 115 is in the closed position, cutout 137 exposes the portion of surface 163 where electrical outlets in the third set are located, thus providing access to those outlets even when cover 115 is closed. If electrical outlets in the third set are located at other surfaces or in other places on power strip 140, additional cutouts, similar to cutout 137, may be positioned in cover 115 or elsewhere so as to provide similar access to those additional electrical outlets.

Cord management feature 113 can take any of several forms. In the embodiment illustrated in FIG. 1, cord management feature 113 is a bracket comprising a finger 171 and a finger 172 that extend out away from stationary portion 111 and create a space 173 through which, for example, power cords may pass, as will be further discussed below. A gap 174 between fingers 171 and 172 serves as a pass-through point where, for example, such power cords may enter or exit space 173. In one embodiment, fingers 171 and 172 are formed out of a material that is more flexible than the material used for other portions of receptacle 110, such that fingers 171 and 172 may be flexed if needed to admit the passage of power cords and the like that are being managed by cord management feature 113. As an example, fingers 171 and 172 may be constructed of a thermoplastic elastomer (TPE), polyvinyl chloride, (PVC) or the like, while other portions of receptacle 110 may be constructed of acrylonitrile butadiene styrene (ABS), polycarbonite, extruded aluminum, sheet metal over plastic, or the like. ABS, for example, is strong, relatively inexpensive, and has pleasing tactile properties.

Figure 2:
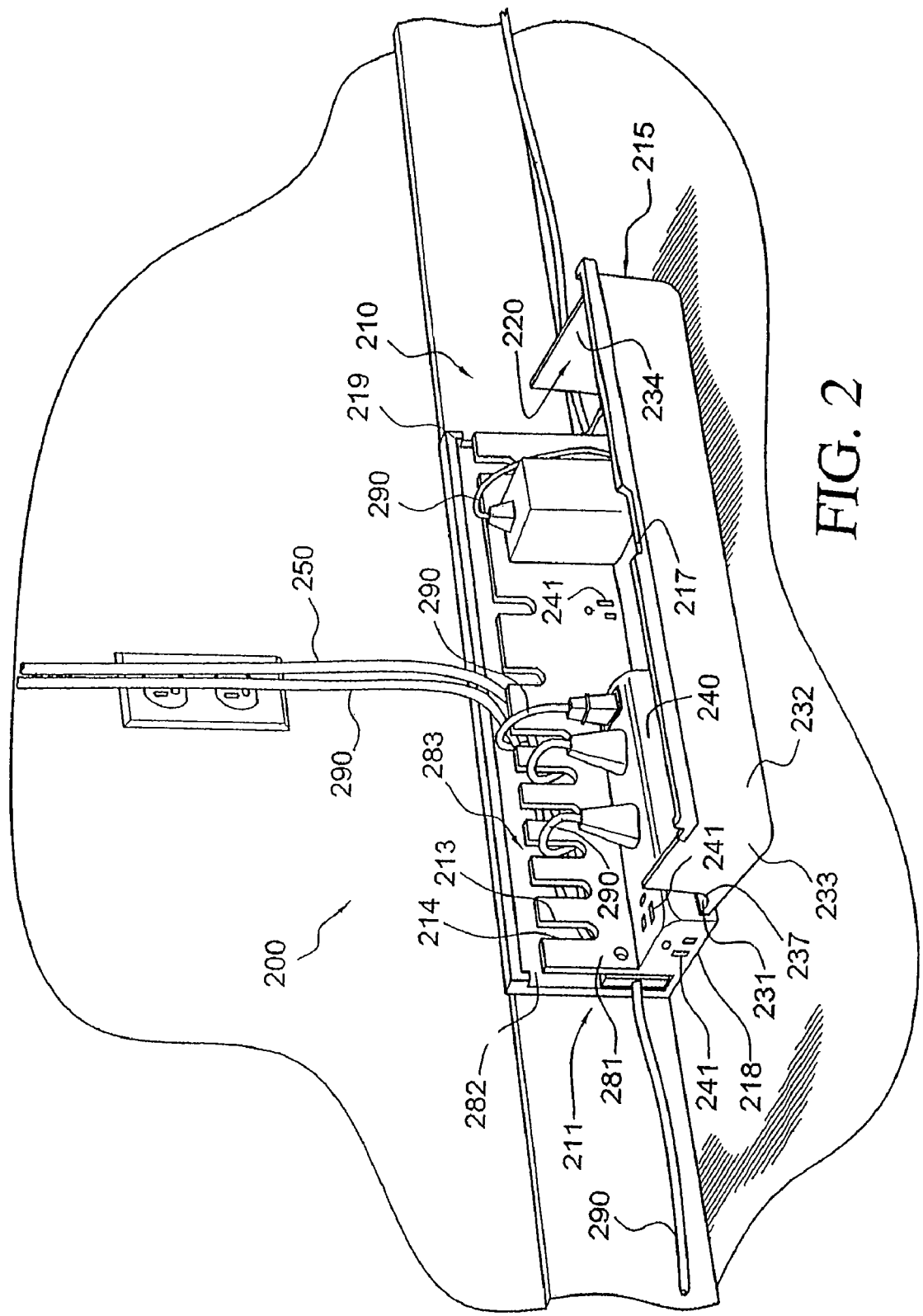
FIG. 2 is a perspective view of a cord management device according to another embodiment of the invention.

FIG. 2 is a perspective view of a cord management device 200 according to an embodiment of the invention. Cord management device 200 is similar in many respects to cord management device 100, as shown by the following description of the components of cord management device 200 in which much of the language used mirrors the language used above to describe cord management device 100. For the sake of simplicity and economy of language, some of the detail given above in connection with the components of cord management device 100 is omitted in this discussion of cord management device 200. However, the details given above for a particular feature or component of cord management device 100 should be understood to apply equally to the corresponding feature or component of cord management device 200, unless the context indicates otherwise.

As illustrated in FIG. 2, cord management device 200 comprises a receptacle 210 defining an interior space 220. Receptacle 210 comprises a stationary portion 211 and a cover 215 hingedly attached to stationary portion 211 and having a cutout 217 therein. Stationary portion 211 comprises a cord management feature 213. Cover 215 is capable of movement between a first position, in which cover 215 substantially encloses interior space 220, and a second position, in which interior space 220 is exposed. Cutout 217 interacts with stationary portion 211 to form an opening in receptacle 210 when cover 215 is in the first position.

Cover 215 comprises a front panel 231, a top panel 232 substantially perpendicular to front panel 231, a side panel 233 substantially perpendicular to front panel 231 and to top panel 232, and a side panel 234 substantially parallel to and spaced apart from side panel 233. In the illustrated embodiment, cutout 217 is located in top panel 232. Cord management device 200 further comprises a cutout 237 in side panel 233.

Interior space 220 is capable of and suitable for containing a power strip 240. Power strip 240, which in one embodiment can be a surge protector or the like, comprises an electrical outlet 241. In a preferred embodiment, electrical outlet 241 is one of a plurality of electrical outlets of power strip 240. Accordingly, the phrase "electrical outlet 241" may be used herein in the same way that "electrical outlet 141" is used. Electrical outlets 241 may be grouped into the same three sets as were electrical outlets 141 in FIG. 1. A power cord 250 is physically and electrically coupled to power strip 140, and is capable of supplying electric power to electrical outlet 141.

In cord management device 200, stationary portion 211 comprises a floor 218 and a wall 219. Wall 219 comprises a front portion 281 spaced apart from a back portion 282. Front portion 281 and back portion 282 define a space 283 therebetween. As an example, space 283 is capable of containing at least a portion of cords 290, thereby organizing cords 290 as well as hiding cords 290 or a portion thereof from view while keeping at least that portion of cord 290 from interfering with electrical outlets 241. Cords 290 can exit out of either end of space 283, as shown in FIG. 2, or can exit out of the opening formed by the interaction of cutout 117 and stationary portion 111, as illustrated in a subsequent figure.

Cord management feature 213 comprises a slot 214 in front portion 281 of wall 219. In the illustrated embodiment, slot 214 is one of a plurality of slots, which together are referred to herein as slots 214. Accordingly, the phrase "slots 214," as it is used herein, can refer both to a single one of the slots or to two or more of the slots, as indicated by the context. As illustrated, slot 214 is capable of receiving a portion of cords 290, and further capable of managing cords 290, for example by organizing and/or hiding them from view. As an example, each one of slots 214 can contain a portion of one of cords 290, thus separating and organizing cords 290 and keeping them from getting tangled or twisted together.

Figure 3:
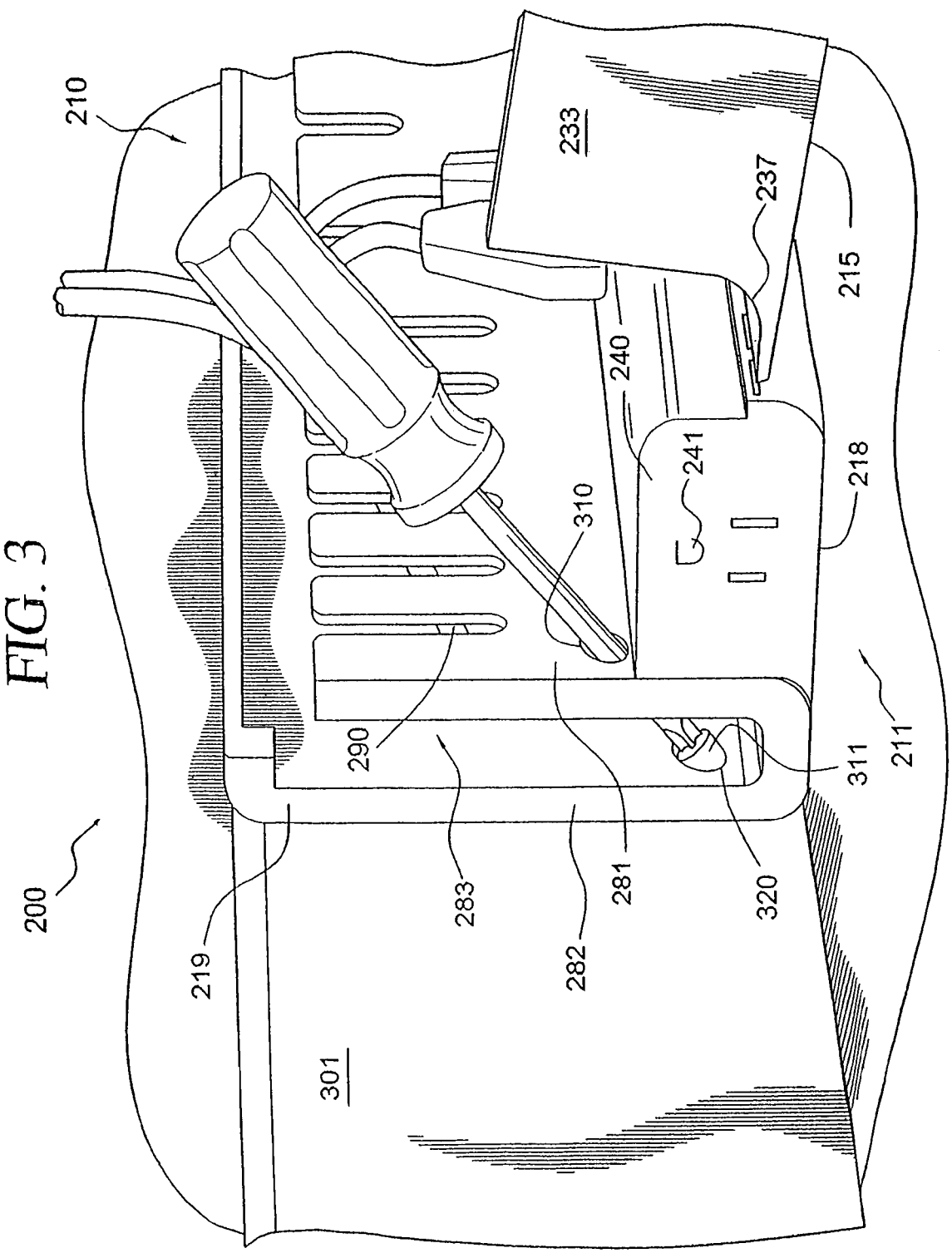
FIG. 3 is a perspective view of a portion of the cord management device of FIG. 2 according to an embodiment of the invention.

FIG. 3 is a perspective view of a portion of cord management device 200 according to an embodiment of the invention. As illustrated in FIG. 3, front portion 281 of wall 219 further comprises an aperture 310 which, in at least one embodiment, is capable of admitting a screwdriver shaft or the like, as shown. It will be understood that the screwdriver is not, or need not be, a component of cord management device 200, but is shown merely to facilitate understanding of cord management device 200 and way in which it may function.

Back portion 282 of wall 219 comprises an aperture 320 which, in at least one embodiment, is capable of admitting a fastening device 311 such as a screw. Apertures 310 and 320 and fastening device 311 may be used to attach cord management device 200 to an object such as a baseboard 301 or the like. In one embodiment, fastening device 311 is permanently captured in aperture 320 such that it cannot fall out and be lost. Fastening cord management device 200 to baseboard 301 lends stability and permanence to cord management device 200, and further enhances the cable management functionality provided thereby.

Figure 4:
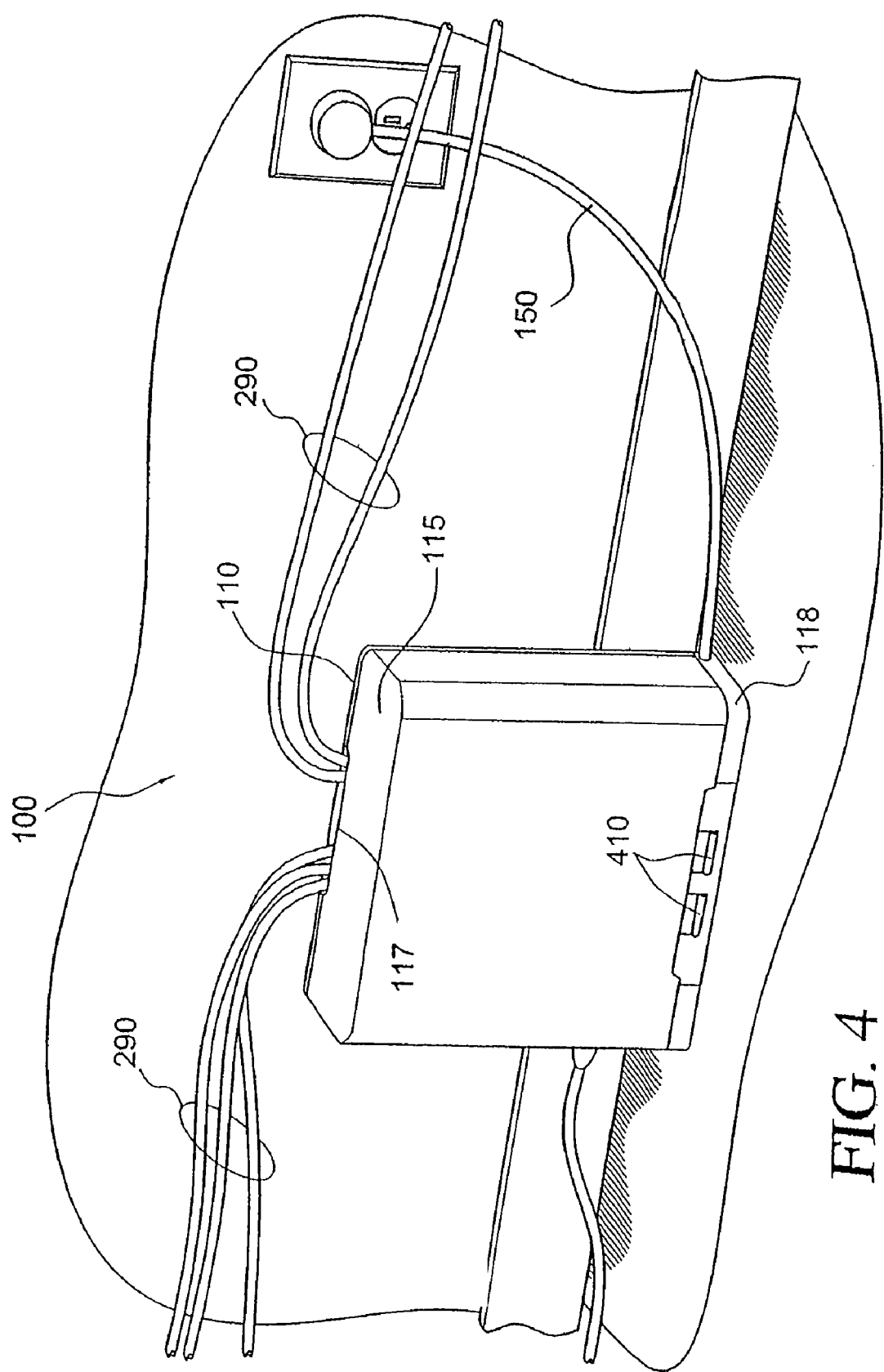
FIG. 4 is a perspective view of the cord management device of FIG. 1 showing a cover of the cord management device in a closed position according to an embodiment of the invention.

FIG. 4 is a perspective view of cord management device 100 with cover 115 in the closed position according to an embodiment of the invention. As shown by FIG. 4, cord management device 100 conceals at least a portion of cords 290 and contributes to a well-organized, aesthetically appealing appearance for cords 290. As further shown by FIG. 4, cord management device 100 further comprises a visual indicator 410 capable of visually conveying information relative to power strip 140. In one embodiment, visual indicator 410 is a light-emitting diode (LED). As an example, visual indicator 410 may display light in a first pattern, color, or the like to indicate operation of cord management device 100 in a first mode, such as, for example, normal operation in surge protection mode, and may display light in a different pattern, color, or the like to indicate operation of cord management device 100 in a different mode, such as, for example, faulty operation in a non-surge-protected mode. In the illustrated embodiment, visual indicator 410 is located at floor 118, but in a non-illustrated embodiment visual indicator 410 may be located elsewhere on receptacle 110 or power strip 140.

Figure 5:
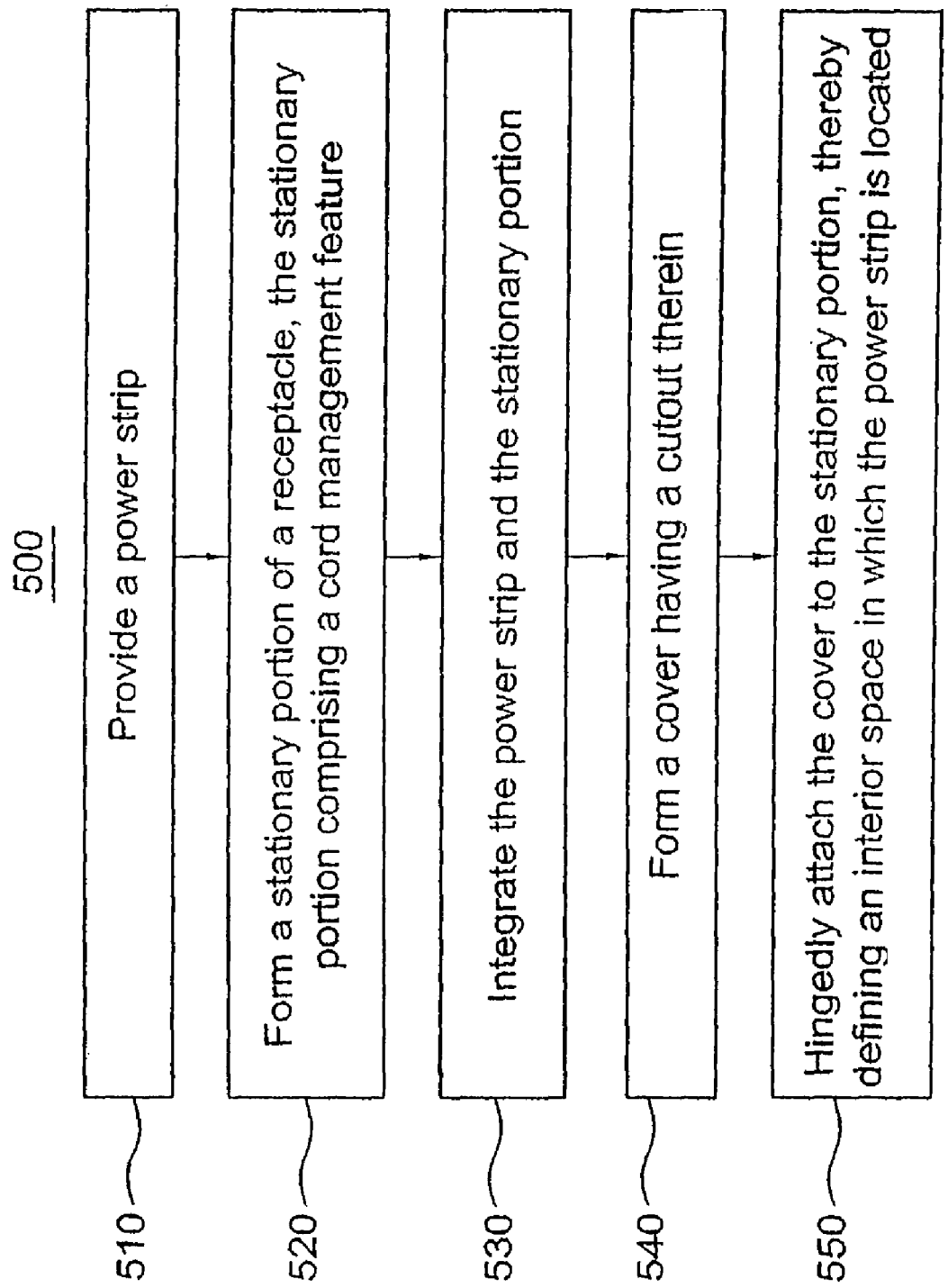
FIG. 5 is a flowchart illustrating a method of manufacturing a cord management device according to an embodiment of the invention.

FIG. 5 is a flowchart illustrating a method 500 of manufacturing a cord management device according to an embodiment of the invention. A step 510 of method 500 is to provide a power strip. As an example, the power strip can be similar to power strip 140, first shown in FIG. 1, and/or to power strip 240, first shown in FIG. 2. In one embodiment, step 510 comprises procuring a fully-formed power strip and integrating it with the cord management device. In a different embodiment, step 510 comprises forming the power strip in the same or a separate procedure used to form one or more other components of the cord management device.

A step 520 of method 500 is to form a stationary portion of a receptacle, the stationary portion comprising a cord management feature. As an example, the stationary portion can be similar to stationary portion 111, first shown in FIG. 1, and/or to stationary portion 211, first shown in FIG. 2. As another example, the cord management feature can be similar to cord management feature 113, first shown in FIG. 1, or to cord management feature 213, first shown in FIG. 2. In one embodiment, step 520 or another step comprises forming an aperture in the stationary portion. As an example, the aperture can be similar to aperture 310 and/or to aperture 320, both of which were first shown in FIG. 3.

A step 530 of method 500 is to integrate the power strip and the stationary portion. In one embodiment, such integration occurs naturally as part of an injection molding or other formation process. In a different embodiment, such integration is accomplished manually by placing a power strip in an interior space formed by the receptacle (see the discussion of step 550, below).

A step 540 of method 500 is to form a cover having a cutout therein. As an example, the cover can be similar to cover 115, first shown in FIG. 1, and/or to cover 215, first shown in FIG. 2, and the cutout can be similar to cutout 117, also first shown in FIG. 1, and/or to cutout 217, first shown in FIG. 2. In one embodiment, step 540 or another step comprises forming a second cutout in the cover in addition to the first cutout. As an example, the second cutout can be similar to cutout 137, first shown in FIG. 1, and/or to cutout 237, first shown in FIG. 2.

A step 550 of method 500 is to hingedly attach the cover to the stationary portion, thereby defining an interior space in which the power strip is located. As an example, the interior space can be similar to interior space 120, first shown in FIG. 1, or to interior space 220, first shown in FIG. 2.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the cord management device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of manufacturing a cord management device, the method comprising:
   providing a power strip;
   physically and electrically coupling a power cord to the power strip;
   providing a stationary portion having a first space and a second space and comprising:
      providing a first wall between the first space and the second space;
      providing two or more slots in the first wall, the two or more slots are configured to contain a first portion of one or more electrical cords;
      providing a second wall spaced apart from the first wall, the first wall and second wall defining the first space there between, the first space is configured to contain a second portion of the one or more electrical cords; and
      providing one or more apertures in the stationary portion with each of the one or more apertures configured to allow a third portion of the one or more electrical cords to exit the first space and out of the cord management device;
   providing a cover;
   coupling the cover to the stationary portion, thereby defining the second space between the cover and the first wall, the stationary portion and the cover are coupled such that the second space can contain a fourth portion of the one or more electrical cords while the first space contains the second portion of the one or more electrical cords and the two or more slots contain the first portion of the one or more electrical cords; and
   locating the power strip in the second space.

2. The method of claim 1 wherein:
   providing the cover comprises:
      providing the cover with a first cutout therein.

3. The method of claim 2, wherein:
   providing the cover further comprises:
      providing a second cutout in the cover.

4. The method of claim 1, wherein:
   providing the cover comprises:
      providing a front panel;
      providing a top panel adjacent to and substantially perpendicular to the front panel;
      providing a first side panel adjacent to and substantially perpendicular to the front panel and the top panel; and
      providing a second side panel substantially parallel to and spaced apart from the first side panel.

5. The method of claim 4, further comprising:
   locating a portion of the power cord in the first space, wherein:
   locating the power strip into the second space comprises:
      integrating the power strip into only the second space.

6. The method of claim 1, wherein:
   providing the power strip comprises:
      providing at least two first outlets with a first outlet of the at least two first outlets separated from a second outlet of the at least two first outlets by a first distance; and
      providing at least two second outlets with a first outlet of the at least two second outlets separated from a second outlet of the at least two second outlets by a second distance; and
   the first distance does not equal the second distance.

7. The method of claim 1, further comprising:
   removably coupling the stationary portion to an exterior surface.

8. A method of manufacturing a cord management device, the cord management device configured to manage two or more electrical cords, the method comprising:
   providing a power strip;
   providing a first portion of the cord management device and comprising:
      providing a floor;

providing a wall adjacent to the floor such that the wall divides an interior space of the cord management device into a first part and a second part; and providing a cord management feature at the wall such that the cord management feature allows a first section of the two or more electrical cords to be located in the first part of the interior space of the cord management device while a second section of the two or more electrical cords are located in the second part of the interior space of the cord management device;

providing a second portion of the cord management device, comprising:

providing a front panel;

providing a top panel adjacent to the front panel;

providing a first side panel adjacent to the top panel and the front panel; and providing a second side panel spaced apart from the first side panel and adjacent to the top panel and the front panel;

physically coupling the power strip to the first portion of the cord management device; and coupling the second portion to the first portion such that the second portion and the first portion define the interior space of the cord management device there between.

9. The method of claim 8, wherein:

providing the power strip comprises:

providing two or more first outlets with a first outlet of the two or more first outlets separated from a second outlet of the two or more first outlets by a first distance; and providing two or more second outlets with a first outlet of the two or more second outlets separated from a second outlet of the two or more second outlets by a second distance; and the first distance is different from the second distance.

10. The method of claim 8, wherein:

providing the cord management feature comprises:

providing two or more slots in the wall with each slot configured to contain a third section of a single cord of the two or more electrical cords.

11. The method of claim 8, wherein:

coupling the second portion to the first portion comprises:

hingedly coupling the front panel to the first portion.

12. The method of claim 11, wherein:

hingedly coupling the front panel to the first portion comprises:

hingedly coupling the front panel to the floor.

13. The method of claim 8, wherein:

providing the second portion of the cord management device further comprises:

providing a first cutout in the top panel.

14. A method of manufacturing a cord management device, the method comprising:

providing a power strip;

providing a stationary portion having at least two openings such that each of the one or more openings allows a first portion of two or more cords to exit out of the cord management device, providing the stationary portion comprises:

providing a first wall with two or more slots; and providing a second wall spaced part from the first wall;

providing a cover, the cover and the stationary portion defining an interior space;

physically coupling the power strip to the stationary portion; and attaching the cover to the stationary portion such that the cover is capable of movement between a first position relative to the stationary portion, in which the cover encloses the interior space, and a second position relative to the stationary portion, in which the interior space is exposed, wherein:

each of the at least two openings are sized large enough to permit the first portion of the two or more cords to exit the interior space simultaneously.

15. The method of claim 14, wherein:

providing the cover comprises:

providing the cover with a first cutout therein.

16. The method of claim 15, wherein:

providing the cover further comprises:

providing a second cutout in the cover; and providing the power strip comprises:

providing two or more electrical outlets such that at least one of the two or more electrical outlets is accessible when the cover is in the first position through the second cutout.

17. The method of claim 14, wherein:

providing the power strip comprises:

providing at least two first outlets with a first outlet of the at least two first outlets separated from a second outlet of the at least two first outlets by a first distance; and providing at least two second outlets with a first outlet of the at least two second outlets separated from a second outlet of the at least two second outlets by a second distance; and the first distance and the second distance are different from each other.

18. The method of claim 14, wherein:

providing the cover comprises:

providing a front panel;

providing a top panel coupled to and substantially perpendicular to the front panel;

providing a first side panel coupled to and substantially perpendicular to the front panel and the top panel; and providing a second side panel substantially parallel to and spaced apart from the first side panel.

19. The method of claim 14, further comprising:

removably coupling the stationary portion to an exterior surface.

20. The method of claim 14, wherein:

providing the first wall with the two or more slots comprises:

providing the first wall with the two or more slots such that the first wall divides the interior space into a first part configured to contain a second portion of the two or more cords and a second part configured to contain a third portion of the two or more cords while the first part contains the second portion of the two or more cords.

21. The method of claim 20, wherein:

providing the first wall with the two or more slots further comprises:

providing the first wall with the two or more slots such that a fourth portion of the two or more cords is located in the two or more slots while the first part contains the second portion of the two or more cords and the second part contains the third portion of the two or more cords.

* * * * *

UNITED STATES PATENT AND TRADEMARK OFFICE
CERTIFICATE OF CORRECTION

PATENT NO. : 7,743,495 B2 Page 1 of 1
APPLICATION NO. : 11/811366
DATED : June 29, 2010
INVENTOR(S) : Mori et al.

It is certified that error appears in the above-identified patent and that said Letters Patent is hereby corrected as shown below:

At column 9, line 45, delete "hingedly".

Signed and Sealed this

Ninth Day of November, 2010

David J. Kappos
*Director of the United States Patent and Trademark Office*